United States Patent [19]
Kataoka

[11] Patent Number: 4,668,729
[45] Date of Patent: May 26, 1987

[54] PROCESS FOR COMPRESSION MOLDING OF THERMOPLASTIC RESIN AND MOLDINGS MOLDED BY SAID PROCESS

[75] Inventor: Hiroshi Kataoka, Tokyo, Japan

[73] Assignee: Asahi Kasei Kogyo Kabushiki Kaisha, Japan

[21] Appl. No.: 681,791

[22] Filed: Dec. 14, 1984

[30] Foreign Application Priority Data

Dec. 15, 1983 [JP] Japan ............................... 58-234950
Mar. 12, 1984 [JP] Japan ................................. 59-45387

[51] Int. Cl.$^4$ ........................ C08J 5/10; B29C 43/20; B29C 55/12; B29C 55/18
[52] U.S. Cl. ................................ 524/449; 156/323; 156/344; 264/511; 264/553; 264/390.2; 264/291; 264/300; 264/338; 264/297.4; 428/910; 524/452; 524/455; 524/519; 524/525
[58] Field of Search ............ 264/322, 511, 553, 290.2, 264/291, 300, 338, 297.4; 156/323, 344; 428/910; 524/449, 452, 455, 519, 525

[56] References Cited

U.S. PATENT DOCUMENTS

| | | | |
|---|---|---|---|
| 2,207,815 | 7/1940 | Ogilby | 264/297.4 |
| 4,028,461 | 6/1977 | Ochsner | 264/297.4 |
| 4,235,834 | 11/1980 | Vetter et al. | 264/291 X |
| 4,304,751 | 12/1981 | Li et al. | 264/322 |

*Primary Examiner*—Philip Anderson
*Attorney, Agent, or Firm*—Finnegan, Henderson, Farabow, Garrett & Dunner

[57] ABSTRACT

The present invention concerns a process for a thin sheet molding of a thermoplastic resin easily and economically and also the thin oriented sheet molding prepared by such a process. Its specific feature resides in the steps of lubricating the inner surface of die, laying over one another thermoplastic resin blanks while being not adhered to each other in a die, compressing the layered structure at a temperature higher than the glass transition temperature of the thermoplastic resin blanks and separating the oriented molded products from each other.

18 Claims, 11 Drawing Figures

PROCESS FOR COMPRESSION MOLDING OF THERMOPLASTIC RESIN AND MOLDINGS MOLDED BY SAID PROCESS

BACKGROUND OF THE INVENTION

This invention relates to a process for molding a thermoplastic resin blank in a compression die to form a thermoplastic resin molding, and also to the molding molded according to said process.

Processes for molding oriented molded products of thermoplastic resins according to compression molding have been described in, for example, U.S. Pat. No. 3,632,841 and others. More specifically, it is shown that the inner surface of a compression die is coated with a lubricant, and a thick thermoplastic resin blank is compressed within the compression die at a temperature higher than the glass transition point but lower than the melting point to be biaxially oriented. According to this compression molding method, the compression force required is different depending on the thickness of the resin blank, and the higher compression force is necessary as the blank is thinner. Therefore, according to this compression molding method, molding of a thin biaxially oriented sheet has heretofore been inefficient and uneconomical.

SUMMARY OF THE INVENTION

An object of the present invention is to improve the method for compression molding of a thin oriented sheet molding of a thermoplastic resin and provide a process for molding economically said oriented sheet. In the present invention, those thin products generally called as film (with thicknesses of not more than about 100 μm) are included within the concept of sheet.

Also, the present invention concerns a method for molding a sheet with smooth surface and an oriented sheet having minute unevenness on the surface.

Futher, the present invention concerns a highly biaxially oriented thin sheet and a method for molding thereof.

According to the present invention, there is provided a process for molding an oriented molded product by compressing a thermoplastic resin blank within a compression die, comprising the steps of:

1. placing two or more layers of thermoplastic resin blanks layered without being adhered to each other;
2. lubricating the inner surface of the die;
3. orienting the resin blank by compression at a temperature higher than the glass transition point of said resin blank; and
4. taking out the molded products after setting from the die and peeling the oriented moldings from each other to give two or more moldings.

DETAILED DESCRIPTION OF THE INVENTION

The thermoplastic resin as mentioned in the present invention refers generally to thermoplastic resins which can be compression molded, including polystyrene, styrene-acrylonitrile copolymers, ABS resins, polyvinyl chloride, polymethyl methacrylate, polycarbonate, polyester, nylon, polyphenyleneether, polyoxymethylene, polyetherimide, polyvinyl alcohol, fluorine resins such as polytetrafluoroethylene, polyolefins such as polypropylene, blends and copolymers of these resins.

Particularly, the present process is suitable for molding of acrylic resins composed mainly of methyl methacrylate (hereinafter abbreviated as MMA), and polymethylmethacrylate (hereinafter abbreviated as PMMA), copolymers of MMA and alkyl acrylate (MMA-AA copolymer), MMA-maleic anhydride-styrene ternary copolymers (MMA-MAH-St copolymer) and MMA-metharcylamide copolymers (MMA-MA-Amide copolymer) may preferably be used. Various kinds of sheets of these acrylic resins may be available, and it is also possible to use preferably extrusion molded sheets, ultra-high molecular weight polymers molded by the cell casting method and gelled polymers subjected to a slight degree of crosslinking.

Ultra-high molecular weight polymers of MMA are excellent in chemical resistance and can give good sheets. These thermoplatic resins may also incorporate, if desired, colorants, UV-absorbers, IR-absorbers, heat-ray reflecting agents, flame retardants, thermal stabilizers, antistatic agents, etc. Acrylic resins are excellent in weathering resistance and transparency, and acrylic resins incorporating UV-absorbers, IR-absorbers, heat-ray reflecting agents can be molded according to the present invention into thin biaxially oriented sheets, which can favorably be used as the grazing materials.

It is also possible to incorporate at least one reinforcing materials selected from glass fibers, mica, asbestos and long fibers of synthetic fibers having great elongations at molding temperature. By biaxially orienting highly the resin formulated with these reinforcing materials according to the process of the present invention, the strength can markedly be improved.

The thermoplastic resin blank as described in the present invention is a plate-shaped blank of the above resin, having a thickness preferably of 0.01 to 50 mm, more preferably of 0.05 to 10 mm.

"To place two or more layers of thermoplastic resin blanks layered without being adhered to each other" means that they are placed under non-adhered state that the oriented moldings molded from the respective blanks can easily be peeled off from each other after compression molding in layers. Easy peel-off may quantitatively be expressed generally as 2 kg/inch or less (200 mm/min.), namely the peel-off strength of 2 kg or lower, more preferably 1 kg or lower, when the molding with one inch width is drawn at a speed of 200 mm/min. For placing the respective blanks in layers without being adhered to each other, it is preferred to employ the method in which a lubricant, a mold release agent or a surfactant is applied on the surface of the respective blanks, the method in which a peeling sheet comprising a resin non-adherable to the blanks is interposed between the respective blanks or the method in which nonadherable blanks are alternately arranged.

It is particularly preferred to use the method in which a peeling sheet comprising a resin non-adherable to the resin blank (hereinafter abbreviated as the peeling sheet) is placed at the interface between the respective blanks. In this case, the peeling sheet should preferably have a viscosity during molding approximate to that of the resin blanks, preferably within the range of 1/100 to 100-fold. If the viscosity difference between the resin blank and the peeling sheet is small, the peeling sheet can also be stretched together with the resin blank, when the resin blank is stretched in compression molding, whereby a uniform oriented molding can be obtained. The most preferable peeling sheet has a viscosity of 1 to 30-fold of the viscosity of the resin blank, and it is a sheet having smooth surface. If a peeling sheet having greater viscosity than the resin blank and having smooth surface is employed, the surface of the peeling sheet is transferred onto the surface of the molding to give a molding with smooth surface.

On the contrary, when a peeling sheet having satin surface is employed, the surface of the peeling sheet is transferred onto the surface of the molding to give a molding with the satin surface. By use of a sheet of a thermoplastic resin having a viscosity during molding greater than that of the resin blank, in which finely pulverized solid such as calcium carbonate, talc, mica, etc. is used, the unevenness caused by these powders can be transferred onto the surface of the molding. By controlling the particle sizes and the amount formulated of these inorganic powders, it is possible to give moldings having surfaces from the matte state to non-glare surface. By use of a thermoplastic resin sheet having a viscosity during molding which is 1- to 30-fold of that of the resin blank, and containing 20 wt. % to 60 wt. % of a fine powder having an average particle size within the range of from 0.1 μm to 10 μm, a non-glare sheet can be obtained. If the particle size of the powdery solid is too great, the product cannot be non-glare but it will become opaque. For molding of a sheet which can maintain transparency to some extent, while exhibiting non-glare characteristic, the average particle size should more preferably be from 0.3 μm to 5 μm, and the amount added more preferably from 25 wt. % to 50 wt. %. If the amount of the fine powdery solid added is less than 20 wt. %, no fine uneven surface preferable for non-glare can be obtained, while an amount in excess of 60 wt. % will make it difficult to knead the powder into the resin.

Such a non-glare sheet can be used for substrates for uses in covers of visual display terminals such as cathode ray tube, and name plate, instruction panel, membrane touch panel, information label, key board of office machines, domestic electric articles, automobiles, etc.

The peeling sheet is required to have a thickness which enables removal of the peeling sheet from the molded product after molding. It is preferred to have a thickness after oriented molding of 5 to 1000 μm, more preferably 10 to 500 μm. A thickness over this range is not ecomonical, while a thickness less than the lower limit makes peel-off difficult. The peeling sheet as mentioned in the present invention is inclusive also of thin films with a thickness of about 10 μm, and it means a peeling sheet or peeling film.

When an acrylic resin is employed for the resin blank, the peeling sheet may be made of polyolefins or nylons having viscosites near the viscosity of the acrylic resin at the molding temperature of 130° to 170° C. of acrylic resin, as exemplified preferbly by polypropylene homopolymers, polypropylenes containing minute amounts of ethylene copolymerized therewith, nylon 11, nylon 12 and nylon 6.

The peeling sheet may be used in two or more layers, if desired. When PMMA is used as the blanks, compression molding may be effected with a sheet of three layers of polypropylene/nylon/polypropylene interposed therebetween, and peeling effected between the polypropylene and the nylon after molding, whereby the PMMA molded product can be handled with propylene attached on both surfaces of PMMA. If a minute amount of a tackfier is applied on the side where polypropylene contacts PMMA, said polypropylene sheet can be utilized after molding as the masking sheet for the purpose of prevention of damaging of the PMMA molding.

The resin blanks are molded with two or more layers, and the number of the layers may be chosen as desired. Generally speaking, from 2 to 100 sheets, preferably from 3 to 30 sheets may be employed. The total thickness of the resin blanks layered or of the resin blanks layered and the peeling sheet may appropriately be selected, but preferably from 1 mm to 100 mm, more preferably from 3 mm to 50 mm. If the total thickness is less than 1 mm, the compression force required for molding becomes so great that the molding becomes difficult. On the other hand, if the total thickness is over 100 mm, molding becomes unstable.

For lubrication of the inner surface of a die, the inner surface of the die may be coated with a lubricant or alternatively a sheet containing a lubricant kneaded therein is permitted to exist at the interface between the inner die surface and the resin blank.

Although, coating of a lubricant is most popularly practiced, it is also possible to effect lubrication by permitting the lubricant kneaded in the outermost resin to bleed out during molding.

The lubricant as mentioned in the present invention refers to a fluid having a viscosity during molding of 5000 poise or lower, preferably 1000 poise or lower, including fluid paraffines, various silicone oils such as polydimethylsiloxane, etc., various fatty acids and metal salts thereof such as stearic acid, metal salts of stearic acid, etc., various surfactants, glycerine, polyethylene glycols, low molecular weight polyethylenes, mixtures of these fluids, and other lubricants generally employed.

Orientation by compression at a temperature higher than the glass transition point of the resin blanks can be accomplished by allowing the layered blanks to undergo plug flow uniformly within the die through the compression force. Molding with uniform plug flow can be attained by making the interface between the inner face of the die and the resin blank dies to a good lubricated state. The present invention is applicable for both monoaxial orientation and biaxially orientation may be possible, but particularly suitably for biaxially oriented molding, and particularly a uniform biaxially oriented sheet with litle birefringence can be excellently molded.

In the present invention, the stretching degree may be chosen as desired, but preferably from 1.1 to 15-fold in terms of area ratio, more preferably 2 to 10-fold.

The molding which can particularly excellently be molded according to the present invention is a biaxially stretched thin sheet of a ultra-high molecular weight PMMA or a ultra-high molecular weight polymer composed mainly of MMA having a weight average molecular weight of 1,000,000 or more. The ultra-high molecular weight PMMA is particularly marked in improvement of performance by biaxial stretching, namely markedly improved in impact resistance and chemical resistance. It is preferred that a biaxial orientation of an average orientation release stress (hereinafter abbreviated as ORS) of 15 kg/cm$^2$ or higher should be applied on the biaxially oriented sheet of such a ultra-high molecular weight PMMA. ORS indicates the orientation degree of the sheet, and it is the shrinking force on heating of the sheet. ORS is measured according to ASTM D 1504. Acrylic resin sheets can be biaxially oriented to be strengthened in impact resistant strength, and the impact resistant strength is markedly increased, when ORS becomes 15 kg/cm$^2$ or higher, particularly 20 kg/cm$^2$ or higher.

Economical molding of such a thin sheet of a ultra-high molecular weight PMMA subjected to such a high degree of biaxial orientation is rendered possible for the first time according to the process of the present invention.

Moderately biaxially oriented sheets of acrylic resins with a thickness of 1 mm or less are excellent in transparency, weathering resistance, scratch resistance, rigidity and impact resistance, and they are useful for name plate, instruction panel of appliances, name plate, membrane touch panel, information label, keyboard of business machine, instrument panel, decorative graphics of automobiles, etc. Otherwise, they can also be utilized for covers of watches, substrates of liquid crystal displays, covers of various instruments and windshields for motorcycles, etc.

In accordance with the process of the present invention, the resin blanks are oriented by compression under heating to give a viscosity suitable for orientation and at a temperature higher than the glass transition point of the resin blanks, and the oriented molded products are set before removal from the comprssion die. "Heating to give a viscosity suitable for orientation at a glass transition point or higher" means heating at a temperature which is chosen generally within the range from the glass transition point to the melting point. However, some resins, which can maintain a very high viscosity even at a temperature higher than the melting point (e.g. a ultra-high molecular weight polymer with an average molecular weight of 1,000,000 or more), can be compression molded according to the present invention even under heating at a temperature higher than the melting point. Setting of the molded products means setting of the moldings so that no shrinkage may occur after taking out from the die, and there may be employed the method in which the molded products are set by cooling to a temperature lower than the glass transition point to be solidified, or contrariwise the method in which heating is continued or the temperature is further elevated to sufficiently crystallize the oriented moldings. The latter method is applicable only for crystallizable resins. The former method may be practiced by heating previously the resin blanks to a molding temperature, effecting compression molding under the state where the die surface is heated substantially to the molding temperature and thereafter cooling the die surface, thereby cooling the molded products to give moldings.

Also, the resin blanks can be coated with sheets having a lower glass transition temperature than that of said resin blanks, while setting the die surface temperature at a certain temperature lower than the glass transition point of the resin blanks but higher than the glass transition point of the coating sheet, and the resin blanks preheated to the molding temperature subjected quickly to compression orientation to give moldings.

According to the process of the present invention, in addition to moldings in the shape of sheet, moldings having no sharp angle such as dome-like moldings and corrugated plates can also be molded, and these moldings are also included in the present invention.

Figure 1:
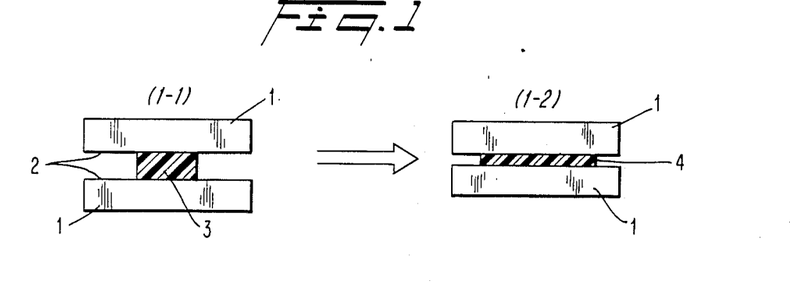
FIG. 1 shows the procedure for molding of a biaxially oriented sheet according to compression molding.

In FIG. 1, the compression die 1 is coated at its inner surface 2 with a lubricant, and the resin blank plate 3 of a thermoplastic resin is placed, heated to a temperature higher than the glass transition point of said blank 3 and then compressed, thereby permitting the blank 3 to plug flow to be biaxially oriented (1-2), followed by cooling as such to obtain a biaxially oriented sheet 4. The compression forces necessary for molding of the biaxially oriented sheet 4 may differ depending on the resin employed, the stretching temperature, the stretching degree, the thickness of the biaxially oriented sheet, etc.

Figure 2:
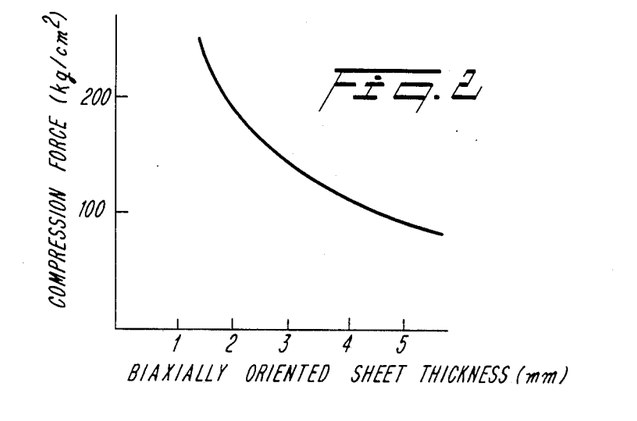
FIG. 2 shows the relationship between thickness of the biaxially oriented sheet and compression force required when MMA-AA copolymer is formed into a biaxially oriented sheet according to the procedure shown in FIG. 1.

FIG. 2 shows the relationship between the biaxially oriented sheet thickness and the necessary compression force when a MMA-AA copolymer containing 5 wt. % methyl acrylate is stretched to 5-fold in terms of area ratio at 140° C. according to the method shown in FIG. 1. As the biaxially oriented sheet thicknesss is thinner, higher compression force is required. The compression molding device is increased in its production cost in proportion to the compression force, and therefore the molding cost is higher as the thickness of the sheet is thinner.

The present invention provides an improved process for molding of thin sheets thus increased in molding cost. Further, it is intended to improvement of productivity by carrying out molding of two or more sheets at one time, as different from the method in which only one sheet can be molded as shown in FIG. 1.

Figure 3:
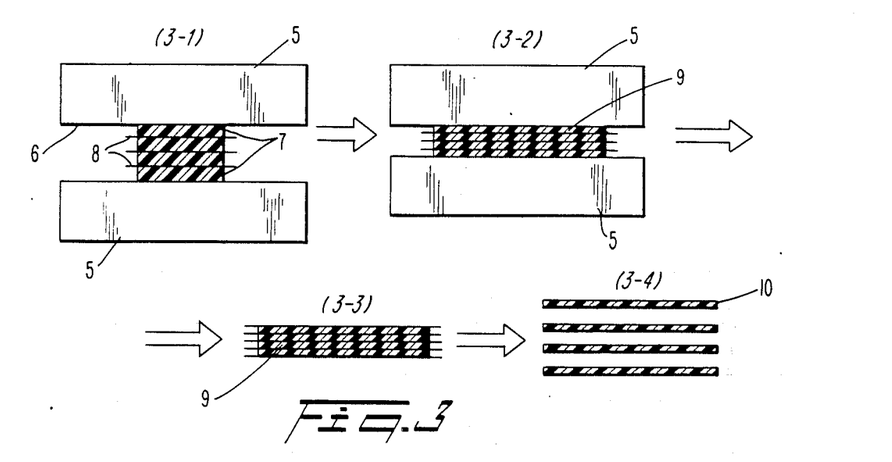
FIG. 3 shows the procedure for molding a biaxially oriented sheet according to the compression molding process of the present invention.

FIG. 3 is presented for illustration of the invention. After the inner surface 6 of the compression die 5 is coated with a lubricant, peeling sheets 8 non-adherable to the resin blanks are placed at the respective interfaces of four thermoplastic resin blank sheets 7 and on both surfaces thereof, and the composite is placed in the compression die (3-1). After heating the blanks to a temperature of a glass transition point or higher so as to give a viscosity suitable for orientation, compression is effected to permit the blanks 7 to plug flow to mold four biaxially oriented sheets 9 (3-3), which are then taken out from the compression die 5 (3-2) and the respective biaxially oriented sheets are peeled off, followed further by peel-off of the peeling sheets from the oriented sheets to obtain thin biaxially oriented sheets 10 (3-4).

Figure 4:
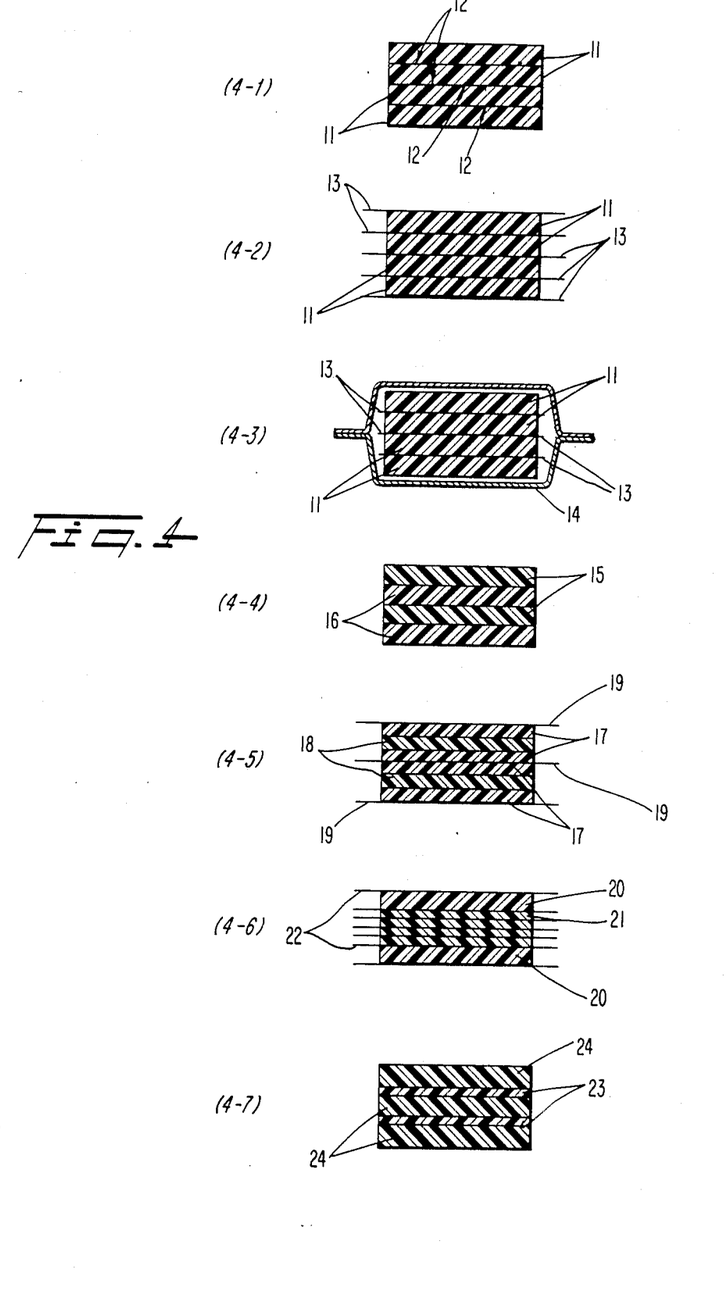
FIG. 4 shows the various methods in which the four layers of resin blanks of the present invention are layered without being adhered to each other.

FIG. 4 shows various kinds of methods in which two or more layers of thermoplastic resin blanks are layered under non-adhered state. (4-1) shows the method in which a lubricant or a mold release agent is applied on the respective interfaces 12 of the resin blanks 11, (4-2) the method in which peeling sheets 13 are placed on the respective interfaces and surfaces of the resin blanks 11, (4-3) the method in which peeling sheets are placed on the respective interfaces of the resin blanks 11 and the layered blanks as a whole are subjected to vacuum packaging with a resin film 14, (4-4) the method in which two kinds of resins non-adherable to each other are layered alternately and (4-5) the method for molding of biaxially oriented sheet of three layers in which the resin blanks comprises three layers of the surface layers 17 and the core 18, and two resin blanks of three layers and peeling sheets are placed at the interface therebetween and on both surfaces. (4-6) shows an embodiment in which two or more blanks with different thicknesses of resin blanks are layered, and a thick blank 20 and a thin blank 21 is placed in layers, with a peeling sheet 22 placed at the interface therebetween. The resin blank may sometimes be thinner than the peeling sheet placed at its interface, and (4-7) shows an embodiment in which a thin resin blank 23 is sandwitched between thick peeling sheets 24. The method of (4-7) can be used particularly preferably in molding of a thin oriented sheet with a thickness of 100 μm or less. Among these various kinds of methods, the method of (4-3) can most preferably be used. This is because, by vacuum packaging of the resin blanks, worsening of the surface of moldings caused by the air remaining at the interface of layers can be prevented. The most preferred embodiment represents carrying out compression molding by use of a resin blank having a mirror-like smooth surface and a peeling sheet having a mirror-like smooth surface after vacuum packaging as shown in (4-3) to effect biaxially orientation, whereby a biaxially oriented molding with smooth surface can be obtained.

The film or sheet to be used for vacuum packaging may be of the same kind as or different from the peeling sheet placed at the interface between respsective resin blanks. It is preferred for stable plug flow compression molding to use a sheet with good slippage on the inner surface of die on the outermost surfaces.

The respective methods as shown in (4-1), (4-4), (4-5), (4-6) and (4-7) can be practiced very effectively, if the whole blank is subjected to vacuum packaging as shown in the method (4-3).

In the process of the present invention, the peeling sheet is stretched similarly as the resin blanks, and of course the stretched peeling sheets can also be utilized as the product.

Figure 5:
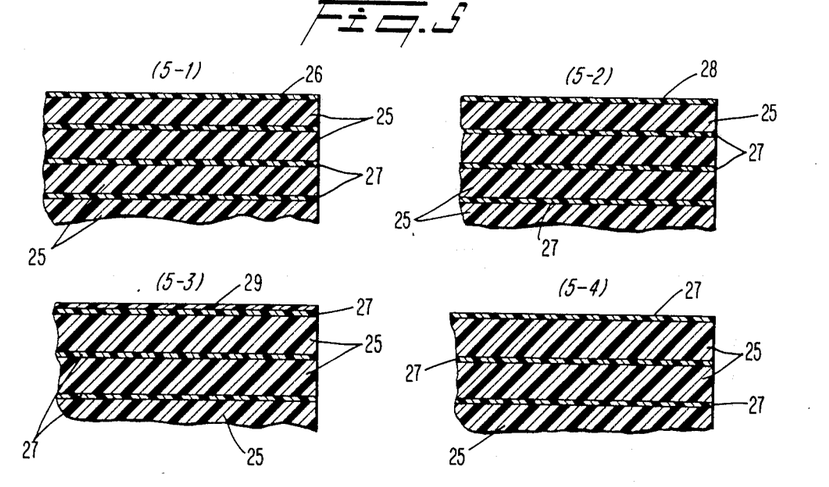
FIG. 5 shows the sectional view of the types of packaging suitable for transportation of the sheet molded according to the process of the present inventon.

FIG. 5 shows sectional views of the types of packaging suitable for transportaion of the sheets molded according to the process of the present invention. In FIG. 5, (5-1) shows the state immediately after compression molding as shown in FIG. 3 (3-3), showing layers of the biaxially stretched sheet 25 and the peeling sheet 27. The peeling sheet 26 as the outermost layer is attached with a lubricant during compression molding, and only the outermost peeling sheet 26 is peeled off, a masking sheet is then plastered for surface protection on the outermost surface (5-2), and the layered structure can be transported as such. When two layers of peeling sheets non-adherable to each other are employed as the surface layer (5-3), only the outermost layer sheet 29 can be peeled off to give a layered structure (5-4) which can be transported well as such.

Figure 6:
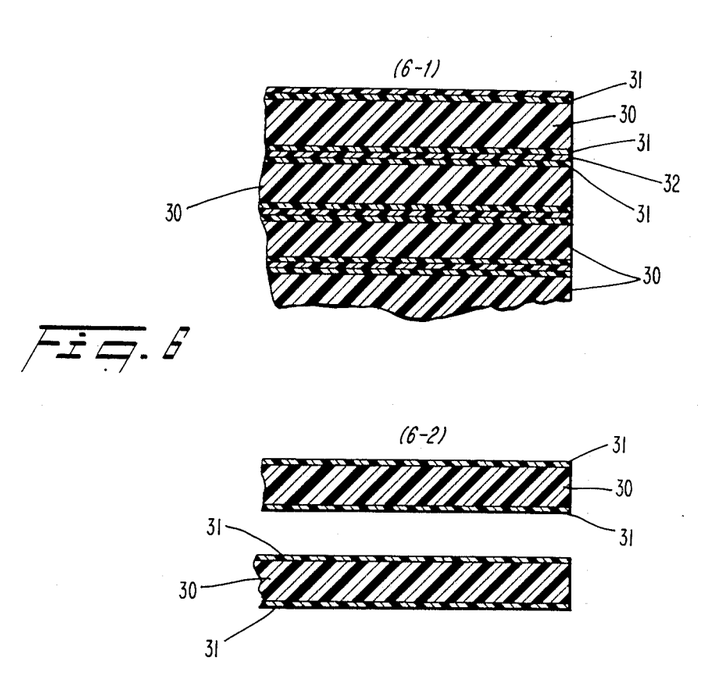
FIG. 6 shows the sectional view of the molding molded according to the process of the present invention.

FIG. 6 shows an oriented molding (6-1) immediately after molding with three layers of peeling sheets and the state (6-2) when one layer attached on each of the upper and lower surfaces of oriented molding is peeled off. The molded oriented molding 30 is nonadherable to the sheet 31 at the surface and the back of the three-layer peeling sheet so as to be readily peeled off, and the peeling sheet 32 at the middle portion and the peeling sheets 31 at the upper and lower surfaces are non-adherable to each other to be readily peeled off. By removal of the peeling sheet 32 in the middle portion, there can be obtained a molding with one layer peeling sheet attached on each of upper and lower surfaces of the oriented molding 30. Transportation or die cutting of the molded product can be done very preferably under this state while preventing the oriented molding from being damaged.

Figure 7:
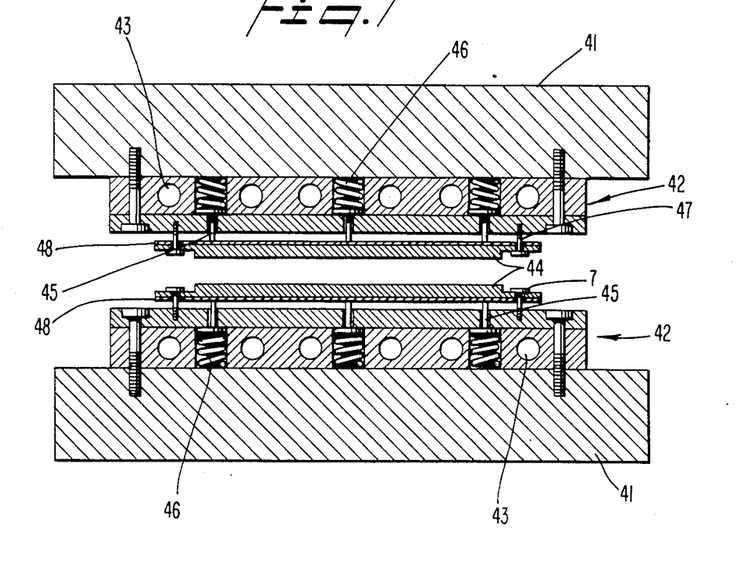
FIG. 7 is the sectional view of a compression sheet-forming apparatus for use in carrying out the sheet-forming process of the present invention.

FIG. 7 is the sectional view of a compression sheet-forming apparatus for use in carrying out the sheet-forming process of the present invention.

Figure 8A:
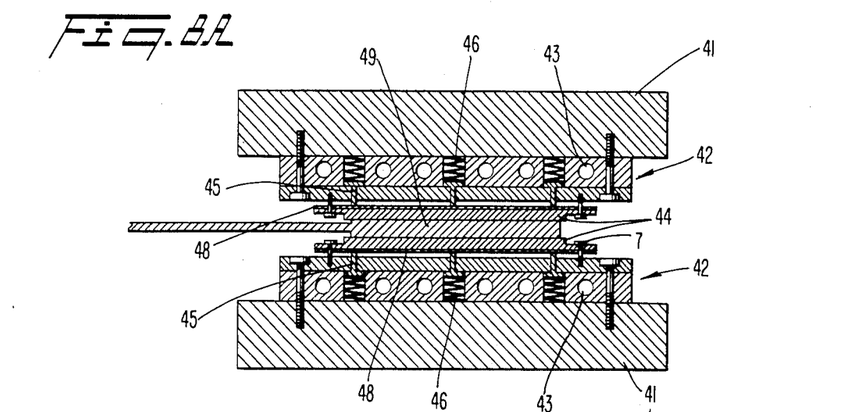
FIGS. 8A, 8B and 8C are diagrams showing the steps of forming a biaxially oriented sheet according to the method of the present invention using the apparatus shown in FIG. 7.
Figure 8B:
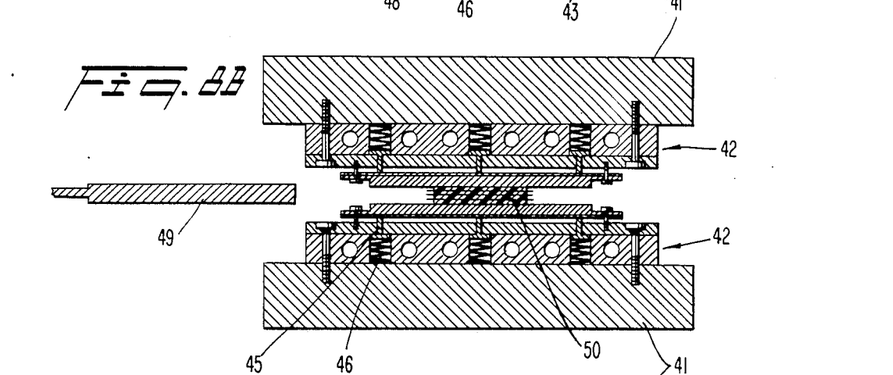
Figure 8C:
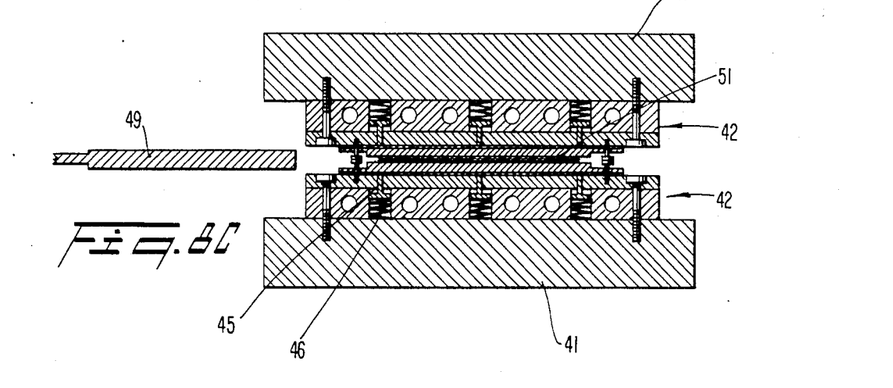

FIG. 8 is a diagram showing the steps of forming a biaxially oriented PMMA sheet according to the method of the present invention using the apparatus shown in FIG. 7.

Referring to FIGS. 7 and 8, each cooling die plate 42 is secured to a die plate 41 of a compression press. A cooling medium hole 43 is formed on the cooling die plate 42 so that the cooling die plate 42 is always cooled by a cooling medium. A mold plate 44 is attached to the cooling die plate 42. In the state where no compressive force is applied to the die plate 41 and the mold plate 44 is opened, the mold plate 44 is held in non-contact with the cooling die plate 42 by a pin 45 pressed by a pressing spring 46 attached to the cooling die plate 42. In order to bring about this non-contact state at a predetermined distance, a bolt 47 is provided and held in the mold plate 44 through a washer ring or the like having a good heat-insulating property placed between the bolt 47 and the mold plate 44. A thin heat-insulating layer 48 is formed on the back side of the mold plate 44 so that when the mold plate 44 is brought into contact with the cooling die plate 42, the rate of cooling the mold plate 44 can be adjusted.

The steps of the sheet-forming operation using the compression sheet-forming apparatus shown in FIG. 7 are illustrated in FIGS. 8A, 8B and 8C.

Referring to FIG. 8A, a heater 49 is inserted between the mold plates 44 to heat the mold plates 44. In this stage, each mold plate 44 is held in non-contact with the cooling die plate 42. Accordingly, the mold plates 44 are promptly heated to a predetermined level at a high efficiency.

Then, the heater 49 is taken out, and a lubricant is coated on the confronting surfaces of the heated mold plates 44 and the layered blank 50 of resins preliminarily heated at a predetermined temeprature is inserted between the mold plates 44 (see FIG. 8B).

Then, a compressive force is applied to the die plates 41 to biaxially orient the resin blank 50 (See FIG. 8C). On compression, each mold plate 44 is brought into contact with the cooling die plate 42 whereby the mold plate 44 is compressed under cooling. The biaxially oriented sheet 11 is uniformly cooled at a high efficiency. The time required for compression of a blank is ordinarily about 3 to about 15 seconds. It is necessary to adjust the thickness of a heat-insulating member 48 arranged on the back side of the mold plate 44 so that during this compression period, the mold plate 44 is not heated to such an extent as rendering the sheet formation difficult.

As is seen from FIGS. 8A, 8B and 8C, the sheet-forming method advantageously adopted in the present invention is characterized in that the mold plates are held substantially in non-contact with the cooling die plates when the mold plates are heated and the mold plates are held in contact with the cooling die plates at the compression step.

The mold plates 44 may be heated by the heater 49 in the state where the mold plates are kept in contact with the heater 49, or the mold plates 44 may be indirectly heated by an infrared radiation heater. Furthermore, a thin heater may be embedded in each mold plate 44.

When the biaxially oriented resin sheet of the present invention is formed, uniform heating of the mold plates and uniform cooling thereof are very important. In the state where the mold plates 44 are opened, the mold plates 44 are pushed by the pins 45 to be thereby held in non-contact with the cooling die plates 42. However, the pins 45 are kept in contact with the mold plates 44, and the cooling of the mold plates 44 is caused through these pins 45 and the temeprature of the mold plates 44 in the vicinity of the pins 45 is lowered. In order to reduce this lowering of the temperature, it is necessary to reduce the thickness of the pins 45.

Description has been made about the process in which layered blanks heated to a temperature appropriate for stretching are biaxially stretched, and cooled, followed by removal of the product out of the die. Similarly, in molding of a part of crystalline thermoplastic resins, layered blanks heated to a temperature appropriate for stretching are subjected to biaxial stretching, subsequently the blanks heated to a temperature for accelerating the crystallization speed to set the product, and thereafter the product is taken out from the die. In this case, a heating medium is passed through the cooling medium hole 43, and the cooling die plate is heated at the crystallilzation temperature. The die plate 42 is higher in temperature than the mold plate 44. Thus, even in the case of crystallization after biaxial stretching, the molding procedure shown in FIG. 8 may be employed as such.

The present invention is a compression molding process which is particularly suitable for molding of a thin biaxially stretched sheet, and a thin biaxially stretched sheet with a thickness of about 10 μm to 1 mm can be molded excellently. It is poor in efficiency to compression molding thin biaxially stretched sheets one by one, but in the present invention, two or more sheets, even up to 10 or more, can be molded in layers.

According to the present invention, thin sheets of biaxially stretched sheets of a ultra-high molecular weight polymer, a resin having a high softening point and a readily heat-decomposable resin, which could difficultly be molded, can be molded excellently.

For example, in the case of acrylic resins having molecular weight of 500,000 or higher molded according to the cell cast method, polyphenylene ether, polyvinyl chloride, etc., good biaxially stretched sheets can be obtained according to the process of the present invention. The biaxially strethed sheet of a ultra-high molecular weight acrylic resin obtained can be a sheet excellent in toughness improved in brittleness of the unstretched sheet of an acrylic resin. The thin film of a polyphenyleneether has selective permeability for gases and can effectively used as a separation membrane. The biaxially stretched sheet molded according to the process of the present invention can be used most excellently, when it is molded into a sheet stretched to 2- to 20-fold in terms of a stretcing degree by area ratio to have a thickness of 10 μm to 1 mm. However, as desired, both sheets of low stretching degree and high stretching degree can excellently be molded.

According to the process of the present invention, it has been rendered possible to mold thin oriented sheets, which have been difficultly molded in the prior art, and a plurality sheets of oriented sheets can be molded by one compression molding, and therefore its economical effect is very great.

According to the process of the present invention, thin oriented sheets of various kinds of thermoplastic resins can be molded economically, and examples of uses of said sheets may include, in the case of thin biaxially oriented sheets of acrylic resins, front plates in liquid crystal display, liquid crystal television, etc., parts of business machines, automobiles, such as name plate, instruction panel, membrane touch panel, information label, key board, instrument panel, decorative graphics, etc., non-glare cover of visual display, surface cover of polarizing plate, laminate with glass, and others.

Further, said sheet may be coated on its surface with a surface hardening layer or said sheet may be laminated with other sheets to give a composite which can excellently be used as desired.

EXAMPLE 1

A PMMA sheet ("Delaglas K", produced by Asahi Chemical Ind.) having smooth surface with a molecular weight of 2,000,000 polymerized according to the cell cast method and thickness of 2 mm was employed as the resin blank, and ten sheets of said blank were layered, and at the respective interfaces therebetween were interposed mirror-surfaced sheets of polypropylene homopolymer (hereinafter abbreviated as PP) with a thickness of 100 μm as the peeling sheet. The thick blank of said ten layered sheets was subjected to vacuum packaging to prepare a blank for compression biaxial oriented molding. According to the molding process as shown in FIG. 7 and FIG. 8, with the mold plate surface being coated with polydimethyl siloxane, the mold plate and the resin blank were heated to 150° C. and compressed to permit the blank to plug flow and be oriented biaxially to 4-fold in terms of area ratio. After the biaxially oriented molding was cooled by cooling the mold plate, the molding was taken out from the compression die, the respective molded products were peeled off from each other, followed further by peel-off of PP, to give 10 sheets of PMMA biaxially oriented sheets having smooth surface with a thickness of 0.5 mm and a stretching degree of 4-fold area ratio.

The compression force necessary for the above compression molding of the biaxially oriented sheet was 90 kg/cm$^2$ immediately before completion of molding.

The ORS of the molded 0.5 mm thick PMMA biaxially oriented sheet was found to be 24 kg/cm$^2$, indicating a high degree of biaxial orientation. The performance of said sheet is shown in the following Table, as compared with the non-oriented PMMA sheet (Delaglas K) with a thickness of 0.5 mm (ultra-high molecular weight PMMA polymerized according to the cell cast method).

Measurements were conducted all under the conditions of 23° C. and 50% R.H.

The biaxially oriented sheet of the present invention exhibited comparable transparency and weathering resistance, and marked improvements in impact resistance and solvent resistance, as compared with the non-oriented sheet.

| Item | Measuring method | Unit | Biaxially oriented PMMA sheet | Non-oriented PMMA sheet |
|---|---|---|---|---|
| Specific gravity | ASTM D 792 | — | 1.19 | 1.19 |
| Light transmittance | ASTM D 1003 | % | 93.1 | 93.1 |
| Haze | ASTM D 1003 | % | 0.3 | 0.3 |
| Tensile strength | ASTM D 638 | kg/cm$^2$ | 850 | 750 |
| Elongation | ASTM D 638 | % | 40 | 5 |
| Dart drop impact strength | *1 | kg cm | 44 | <0.5 |
| Weathering resistance | | *2 | B | B |
| Solvent resistance: | | | | |
| Acetone | *3 | | B | D |
| Methyl ethyl ketone | | | B | D |
| Ethyl acetate | | | B | D |
| Toluene | | | A | D |
| Xylene | | | A | D |
| Kerosene | | | A | C |
| Methanol | | | B | D |
| Ethanol | | | A | D |
| Isopropyl alcohol | | | A | D |

Note
*1 Fixing: 5 inch diameter frame; height: 1 m, natural falling; Dart: ¼ inch R.
*2 B: no yellow decoloration after exposure in Sunshine Weather-o-meter for 2000 hours.
*3 Solvent is coated under appltion of a surface stress of 650 kg/cm$^2$, and formation of craze, crack and fracture is observed.
A: no craze, crack, fracture formed after 30 minutes;
B: craze and crack formed, but no fracture, within about 15 minutes;
C: craze and crack formed, but no fracture, within about 5–6 minutes;
D: fractured within one minute.

Figure 9:
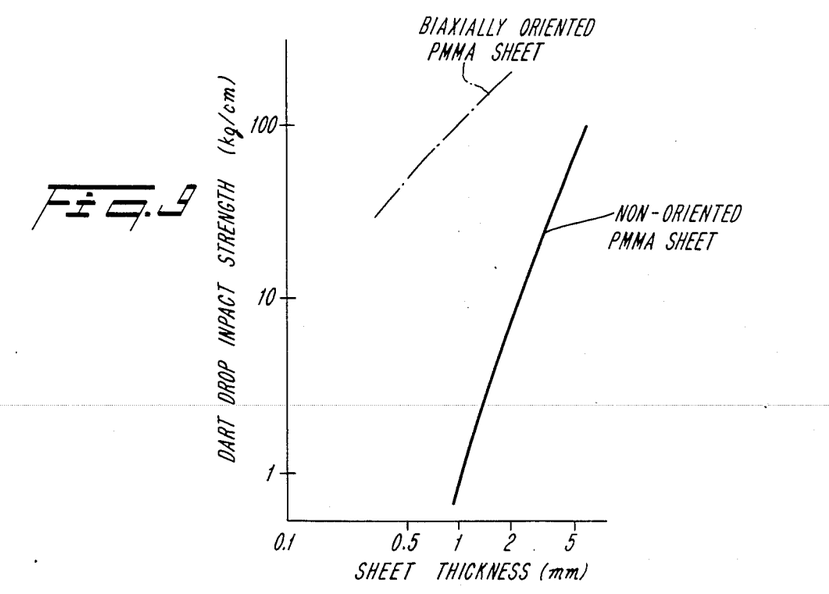
FIG. 9 is a graph showing the dart drop impart strengths of the biaxially oriented sheet and the nonoriented sheet of PMMA.

Similarly, molding was performed with the use of PMMA sheets (Delaglass K) with thicknesses of 1.5 mm, 3 mm, 4 mm and 5 mm, to mold biaxially oriented PMMA sheets with thickness of 0.38 mm, 0.75 mm, 1 mm and 1.25 mm, respectively. The dart drop impact strengths of the respective sheets were measured and shown in FIG. 9, as compared with the non-oriented PMMA sheets. The difference in dart drop impact strength between the biaxally oriented PMMA sheets and the non-oriented PMMA sheets was greater as the thickness was thinner. Thus, in the field of the thin PMMA sheets which could not be used due to small impact strength, the sheets molded according to the present invention can be excellently used. The PMMA biaxially oriented thin sheets excellent in toughness were very useful for name plate, watch cover, liquid crystal subsrate, instrument cover, motorcycle windshield, etc.

COMPARATIVE EXAMPLE 1

By use of one sheet of the 2 mm thick PMMA sheet as employed in Example 1 as the blank, biaxial orientation molding was carried out according to the compression molding process as shown in FIG. 7 and FIG. 8. Biaxial orientation was effected to 4-fold in terms of area ratio to obtain one biaxially oriented sheet. The compression force necessary for compression molding of the biaxially oriented sheet was 240 kg/cm$^2$.

EXAMPLE 2

By using the respective resins and the respective peeling sheets, molding was carried out similarly as in Example 1 at the molding temperatures shown below.

| Resin blank | Peeling sheet | Molding temp. |
|---|---|---|
| MMA-AA copolymer with 5 wt. % of methyl acrylate (Delaglas A, produced by Asahi Chemical Ind.) | PP | 140° C. |
| MMA-MAAmide copolymer with 8 wt. % of methyl methacrylamide (Plexiglas 55, produced by Rohm & Haas) | Nylon 12 | 160° C. |
| MMA-MAS-St (Delpet 980, produced by Asahi Chemical Ind.) | Nylon 12 | 160° C. |
| Polystyrene (Styron 666, produced by Asahi Chemical Ind.) | PP | 130° C. |
| Styrene (75 wt. %)-acrylonitrile (25 wt. %) copolymer (Stylac AS, produced by Asahi Chemical Ind.) | PP | 140° C. |
| Rigid polyvinyl chloride | High density polyethylene | 140° C. |

In any of the resins, ten sheets of good biaxially oriented sheets of 0.5 mm in thickness with smooth surface were obtained.

EXAMPLE 3

Using a 2 mm thick sheet of MMA-AA copolymer with methyl acrylate content of 5 wt. % (Delaglas A) having smooth surface as the resin blank, twenty sheets of the sheet were layered and compression molding was carried out similarly as in Example 1 at 150° C. with biaxial stretching to 10-fold area ratio to obtain 20 sheets of biaxially oriented sheets with a thickness of 0.2 mm having smooth surface.

EXAMPLE 4

Using a 2 mm thick sheet of a ultra-high molecular weight PMMA (Delaglas K) polymerized according to the cell cast method as the blank, 15 sheets of said blank were layered and compression molding was conducted similarly as in Example 1, with PP sheets containing fillers as shown below incorporated by homogeneous dispersion being disposed as peeling sheets at the interfaces between the respective blanks and on both the top and the bottom of the layered blanks.

(A) 40 wt. % of talc with average particle size of 1 μm;

(B) 40 wt. % of calcium carbonate with average particle size of 0.15 μm;

(C) 40 wt. % of calcim carbonate with average particl size of 15 μm; and (D) 40 wt. % of mica with average diameter of 50 μm.

On the surface of the PMMA biaxially oriented sheet with a thickness of 0.5 mm obtained, the unevenness of the peeling sheet surface was transferred, (A) and (B) giving a surface suitable for use as translucent, non-glare sheet, while (C) and (D) giving satin-like surface with greater amount of diffused transmitted light. Each sheet was also found to be an excellent sheet having weathering resistance, solvent resistance, tensile strength and elongation substantially the same as the biaxially oriented sheets as shown in Example 1.

EXAMPLE 5

A set of resin blanks is formed from a 2 mm thick sheet (Delaglas K) with smooth surface of PMMA having a weight average molecular weight of 2,000,000 polymerized according to the cell cast method and a 2 mm thick sheet with smooth surface of a bisphenol A type polycarbonate (Panlite, produced by Teijin) (PC) to a layered structure of PMMA/PC/PMMA, and two sets of said resin blanks are superposed one on another and a mirror-surface film of Nylon 12 with a thickness of 100 μm was interposed at the interface therebetween. The layered structure of PMMA/PC/PMMA/Nylon 12/PMMA/PC/PMMA is subjected to vacuum packaging with a 100 μm thick Nylon 12 film and thereafter oriented biaxially to 4-fold area ratio by compressing at 170° C. in a compression die coated with polydimethyl siloxane. After cooling, the biaxially oriented molding is taken out from the die, the products are peeled from each other, followed by removal of the Nylon 12 film, to give two sheets of biaxially oriented sheet with smooth surface of a three-layer structure of PMMA/PC/PMMA structure with a thickness of 1.5 mm. The three-layer stretched sheet is further excellent in toughness than the stretched sheet of PMMA alone, and also retains the surface hardness and weathering resistance of PMMA.

EXAMPLE 6

Using a PMMA sheet (Delaglas K) with smooth surface having a thickness of 0.5 mm polymerized according to the cell cast method as the resin blank, 40 sheets of said blank are layed over one another, mirror-surfaced films of PP with a thickness of 10 μm are each disposed at the interface between the respective adjacent blanks and on both end surfaces of the layered blanks, and biaxial stretching is effected to 5-fold area ratio similarly as in Example 1. Forty sheets of biaxially oriented PMMA sheet, each being smooth on its surface and having a thickness of 0.1 mm, are obtained by once molding.

EXAMPLE 7

Ten sheets of a 0.3 mm thick PMMA sheet ("Clarex", produced by Nitto Resin Ltd.) were layed over one another, with further provision of a 10 mm thick PMMA sheet (Delaglas K) on top and bottom of the layers to provide a resin blank, and biaxial stretching to 5-fold area ratio was performed similarly as in Example 1, with mirror-surfaced films with a thickness of 100 μm of PP being disposed at the interfaced between the respective adjacent blanks and on both end surfaces. Ten sheets of a 60 μm thick sheet with smooth surface and two sheets of a 2 mm thick sheet were obtained. By sandwitching the blanks with a thickness of 0.3 mm between PMMA with a thickness of 10 mm, stretching of 0.3 mm PMMA blanks could stably be conducted.

EXAMPLE 8 and a 1 mm

A 0.1 mm thick polyphenylene ether and a 1 mm thick bisphenol type polycarbonate are layered alternately to prepare a 11-layer structure of resin blank with both end surfaces made of the polycarbonate, which blank is pre-heated to 220° C. and subjected to compression in a compression die, while being sandwitched between the die plates coated on the inner surfaces with polydimethyl siloxane as the lubricant, to be biaxially stretched to a 5-fold area ratio. After cooling, the molding is taken out from the die to obtain the products of 5 sheets of polyphenyleneether biaxially oriented sheet with a thickness of 20 μm and 6 sheets of polycarbonate biaxially stretched sheet with a thickness of 200 μm.

EXAMPLE 9

The following layered resin was employed as the blank for compression molding:

PP (0.1 mm)/PMMA (5 mm)/PP (0.1 mm)/PMMA (5 mm)/PP (0.1 mm)/PMMA (5 mm)/PP (0.1 mm).

The above blank in which PP and PMMA are alternately layered was subjected to vacuum packaging with a high density polyethylene with a thickness of 0.5 mm, and said resin was pre-heated to 160° C. By use of a compression die shaped in a dome with a radius of curvature of 30 cm, the compression die was set at a constant temperature of 90° C. and coated on its surface with polydimethyl siloxane. Under these conditions, the above pre-heated blank was compressed to be biaxially stretched to 4-fold area ratio, and 10 minutes later the molding was taken out from the compression die. Three dome-shaped biaxially oriented PMMA moldings with a thickness of 1.2 mm were obtained. Said dome-shaped molding was excellent in weathering resistance and impact resistance, and found to be very excellent as domes for natural lighting of constructions.

EXAMPLE 10

The layered sheet of the following structure was employed as the blank for compression molding:

PMMA/PP/Nylon 6/PP/PMMA/PP/Nylon 6/ . . . PP/PMMA/PP wherein PP is a mirror-surfaced sheet with a thickness of 100 μm; PMMA is a sheet (Delaglas K) with a thickness of 2 mm prepared by cell cast polymerization; and Nylon 6 is a mirror surfaced sheet with a thickness of 100 μm.

According to the combination as mentioned above, 21 sheets of PP as the total, 10 sheets of PMMA as the total and 9 sheets of Nylon 6 as the total were layered, and the whole layered structure was vacuum packaged with a high density polyethylene sheet with a thickness of 100 μm, followed by pre-heating to 150° C. The above layered blank was compressed by a compression die pre-heated on the surfaces at 150° C. and coated with polydimethyl siloxane to be biaxially oriented to 4-fold area ratio. The die surfaces were cooled and thereafter the biaxially oriented molding was taken out, and the respective PMMA sheets were separated from each other to obtain 0.5 mm thick biaxially oriented PMMA sheet with PP being attached on both surfaces of PMMA as described in FIG. 6. With such a state where PP is attached to each PMMA sheet, PP functioned as the masking material and transportation and die cutting could be done as such.

EXAMPLE 11

A 2 mm thick sheet of a polyetherimide (ULTEM 1000 produced by General Electric Co.) is used as the resin blank in five sheets of layers, and sheets of poly-4-methylpentene-1 with a thickness of 100 μm were disposed at interfaces between the respective adjacent resin blanks and on both surfaces of the layered structure, and the whole structure was vacuum packaged with a 100 μm thick sheet of poly-4-methylpentene-1 to provide a blank for compression biaxially oriented molding. Said blank was heated between two iron plates heated at 230° C. for 15 minutes, and said blank was compressed with a die heated at 230° C. and lubricated to be biaxially oriented to a 4-fold area ratio. The die was cooled to cool the oriented molding, which was then taken out and separated into respective molded products to obtain 5 biaxially oriented sheets of polyetherimide with a thickness of 0.5 mm.

EXAMPLE 12

Ten sheets of a non-crystalline blank with a thickness of 1 mm of a polyethyleneterephthalate having a [η] of 0.9 (as measured in a mixture of phenol/tetrachloroethane at a weight ratio of 60/40 at 25° C.) are layed over one another and, at the interfaces between the respective adjacent polyethylene terephthalene sheets and on both surfaces of the layered structure, 11 sheets as the total of high density polyethylene with smooth surface having a thickness of 100 μm are disposed. Further, the whole layered structure as prepared above is subjected to vacuum packaging to provide a blank for compression biaxially oriented molding. The inner surface of the spherical compression die with a radius of curvature of 30 cm is coated with polydimethyl siloxane and the compression die surface is heated to 150° C. After pre-heating the vacuum packaged resin blank to 95° C., compression molding is carried out in the compression die of 150° C. to be biaxially stretched to a 10-fold area ratio and thereafter the molding is maintained by heating in the mold as such at 150° C. for 5 minutes, followed by taking out from the mold. The non-crystalline polyethyleneterephthalate blank, after being biaxially stretched in spherical shape at 95° C., is maintained at 150° C. to be crystallized, whereby ten sheets of spherical polyethyleneterephthalate sheets with a thickness of 100 μm biaxially stretched to 10-fold and crystallized are obtained. In the prior art, it has been difficult to mold a biaxially stretched sheet of polyethyleneterephthalate in a curved shape, but a good molding can be obtained according to the above procedure.

EXAMPLE 13

After a polyethylene terephthalate having a [η] of 1.1 (as measured in a mixture of phenol/tetrachloroethane at a weight ratio of 60/40 at 25° C.) was dried sufficiently, it was injection molded at 295° C. to mold a nos-crystalline transparent sheet molding with a thickness of 2 mm. Five sheets of said sheet were layered and HD polyethylene sheets with a thickness of 0.1 mm were inserted at the interfaces between the respective adjacent sheets, and the whole layered structure was vacuum packaged with a HD polyethylene sheet with a thickness of 0.1 mm to give a resin blank. By means of the compression die as shown in FIG. 7 and FIG. 8, biaxially oriented molding was carried out. By setting the mold plate 44 at 80° C. and the die plate 42 at 140° C., the resin blank pre-heated to 80° C. was placed on the mold plate 44 coated with a lubricant and compressed to be biaxially stretched to a 7-fold area ratio, and compression was continued under the same conditions to heat and crystallize the molding at 140° C. before the molding was taken out from the compression die. The respective layers were separated from each other to obtain 5 sheets of biaxially oriented and crystallized polyethylene terephthalate with a thickness of about 0.28 mm.

EXAMPLE 14

Five sheets of polytetrafluoroethylene with a thickness of 0.5 mm and six sheets of PP with smooth surface having a thickness of 2 mm are alternately layered and the whole layered structure is vacuum packaged by PP sheet having a thickness of 100 μm to give a blank. The inner surface of a compression die is coated with polydimethyl siloxane, and the blank is compressed by heating the inner surface of the compression die and the blank to 140° C. to permit the blank to plug flow, thereby effecting biaxial orientaion to a 1.5-fold area ratio. The molding is cooled by cooling the compression die surface, and then the molding is taken out and the layered structure is separated into respective molded products to obtain 0.33 mm thick sheets of polytetrafluoroethylene and 1.5-fold stretched PP sheets with a thickness of 1.3 mm.

What is claimed is:
1. A process for molding an oriented molding by compressing thermoplatic resin blanks in a compression die, comprising the steps of:
   1. placing two or more layers of thermoplastic resin blanks layered without being adhered to each other;
   2. lubricating the inner surface of the die;
   3. orienting the resin blank by compression at a temperature higher than the glass transition point of said resin blanks; and
   4. taking out the molded products after setting from the die and peeling the oriented moldings from each other to give two or more moldings.
2. The process of claim 1, wherein the thermoplastic resin is an acrylic resin.
3. The process of claim 1, wherein the thermoplastic is selected from among polystyrene, styrene-acrylonitrile copolymer, ABS resin, polyvinyl chloride, polyetherimide, polyvinyl alcohol, polycarbonate, polyester, nylon, polyphenylenether, polyoxymethylene, polyethylene and polypropylene.

4. The process of claim 1, 2 or 3, wherein the thermoplastic resin contains at least one reinforcing material of glass fiber, mica and asbestos.

5. The process of claim 1, 2 or 3, wherein a biaxially oriented molding is molded.

6. The process of claim 1, wherein a peeling sheet comprising a resin non-adherable to the blanks is disposed between the respective adjacent blanks, thereby making the respective adjacent blanks not adhered to each other.

7. The process of claim 6, wherein the peeling sheet is a thermoplastic resin having a smooth surface.

8. The process of claim 6, wherein the peeling sheet is a thermoplastic resin sheet containing a powder of calcium carbonate, talc or mica.

9. The process of claim 6, 7, or 8, wherein after layering of the blanks and the peeling sheets, the layered structure is subjected to vacuum packaging before molding.

10. A thin sheet produced by a process for molding an oriented molding by compressing a thermoplastic resin blank in a compression die, comprising the steps of:
   1. placing two of more layers of thermoplastic resin blanks layered without being adhered to each other;
   2. lubricating the inner surface of the die;
   3. orienting the resin blank by compression at a temperature higher than the glass transition point of said resin blanks; and
   4. taking out the molded products after setting from the die and peeling the oriented moldings from each other to give two or more moldings.

11. A thin sheet according to claim 10, wherein the thermoplastic resin is an acrylic resin.

12. A thin sheet according to claim 10, wherein the thermoplastic resin is selected from among polystyrene, styrene-acrylonitrile copolymer, ABS resin, polyvinyl chloride, polyetherimide, polyvinyl alcohol, polycarbonate, polyester, nylon, polyphenylenether, polyoxymethylene, polyethylene and polypropylene.

13. A thin sheet according to any one of claims 10, 11 or 12, wherein the thermoplastic resin contains at least one reinforcing material of glass fiber, mica and asbestos.

14. A thin sheet according to any one of claims 10, 11 or 12, wherein a biaxially oriented molding is molded.

15. A thin sheet according to claim 10, wherein a peeling sheet comprising a resin non-adherable to the blanks is disposed between the respective adjacent blanks, thereby making the respective adjacent blanks not adhered to each other.

16. A thin sheet according to claim 15, wherein the peeling sheet is a thermoplastic resin having a smooth surface.

17. A thin sheet according to claim 15, wherein the peeling sheet is a thermoplastic resin sheet containing a powder of calcium carbonate, talc or mica.

18. A thin sheet according to any one of claims 15, 16 or 17, wherein after layering of the blanks and the peeling sheets, the layered structure is subjected to vacuum packaging before molding.

* * * * *